United States Patent
Komulainen

(10) Patent No.: US 9,836,333 B2
(45) Date of Patent: Dec. 5, 2017

(54) MULTI-FUNCTION BUTTON FOR WEARABLE DEVICE

(71) Applicant: Polar Electro Oy, Kempele (FI)

(72) Inventor: Olli Komulainen, Oulu (FI)

(73) Assignee: POLAR ELECTRO OY, Kempele (FI)

( * ) Notice: Subject to any disclaimer, the term of this patent is extended or adjusted under 35 U.S.C. 154(b) by 0 days.

(21) Appl. No.: 15/245,843

(22) Filed: Aug. 24, 2016

(65) Prior Publication Data
US 2017/0060646 A1   Mar. 2, 2017

(30) Foreign Application Priority Data
Aug. 26, 2015   (GB) .................................. 1515158.2

(51) Int. Cl.
| | |
|---|---|
| G06F 9/54 | (2006.01) |
| G04G 21/02 | (2010.01) |
| G06F 9/455 | (2006.01) |
| G06F 1/16 | (2006.01) |
| G06F 3/0482 | (2013.01) |
| G06F 3/0484 | (2013.01) |

(52) U.S. Cl.
CPC ............ *G06F 9/541* (2013.01); *G04G 21/02* (2013.01); *G06F 1/163* (2013.01); *G06F 1/1684* (2013.01); *G06F 3/0482* (2013.01); *G06F 3/0484* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 2004/0190380 A1* | 9/2004 | Wojcieszak | ............ G04G 9/007 368/69 |
| 2010/0131858 A1 | 5/2010 | Schultz et al. | |
| 2014/0189584 A1 | 7/2014 | Weng et al. | |

(Continued)

FOREIGN PATENT DOCUMENTS

EP   2612595 A2   7/2013

OTHER PUBLICATIONS

Sander Marskamp, "Part 1: Sony SmartWatch 3 useful review, cycling, GPS and Playing Music", You Tube [online], available from: https://youtu.be/JRUXx95WOBg [Accessed Oct. 28, 2016], pp. 1-4, Apr. 2, 2015.

(Continued)

*Primary Examiner* — Syed Roni
(74) *Attorney, Agent, or Firm* — Hoffmann & Baron, LLP

(57) ABSTRACT

A multi-function button is provided for a wearable device. A method includes associating, by at least one processor of the wearable device, operation of a button of a user interface of the wearable device with a quick-launch function of a computer program application stored in the wearable device, wherein operation of the button in a state where the computer program application is not being executed and where an icon identifying and enabling launch of the computer program application is not being displayed causes launch of the computer program application; and detecting, by the at least one processor while the computer program application is being executed, operation of the button and, in response to the detection, causing execution of a function of the computer program application.

19 Claims, 6 Drawing Sheets

(56) References Cited

U.S. PATENT DOCUMENTS

| | | | |
|---|---|---|---|
| 2014/0200470 A1* | 7/2014 | Puolakanaho | A61B 5/0006 |
| | | | 600/509 |
| 2015/0049591 A1 | 2/2015 | Adams et al. | |
| 2015/0098309 A1 | 4/2015 | Adams et al. | |
| 2015/0205351 A1 | 7/2015 | Osterhout et al. | |
| 2016/0147222 A1* | 5/2016 | Haberl | G06F 1/163 |
| | | | 701/2 |

OTHER PUBLICATIONS

DC Rainmaker, Polar V800 Multisport GPS Watch In-Depth Review, dcrainmaker.com, Available from: https://www.dcrainmaker.com/2014/06/polar-v800-depth-review.html, pp. 1-112, Jun. 9, 2014.

International Search Report for corresponding PCT Application No. PCT/FI2016/050577, pp. 1-5 (Nov. 15, 2016).

GB Amended Search Report for corresponding GB Application No. GB1515158.2, pp. 1-2 (Oct. 12, 2015).

OScrunch, Sep. 30, 2014. "Pebble Watch (New in version 2.6)", YouTube [online]. Available from: https://youtu.be/c5qnkIDCKyE [Accessed Oct. 9, 2015], p. 1.

Combined Search and Examination Report, Application No. GB1515158.2, Oct. 13, 2015, 9 pages.

* cited by examiner

MULTI-FUNCTION BUTTON FOR WEARABLE DEVICE

CROSS-REFERENCE TO RELATED APPLICATION

This application claims benefit to United Kingdom Application No. 1515158.2, filed Aug. 26, 2015, which is incorporated by reference herein in its entirety.

BACKGROUND

Field

The present invention relates to wearable devices and, particularly, to a user interface of a wearable device.

Description of the Related Art

With the development of mobile operating systems and improving processor technology, multi-function smart watches have become available. Such smart watches typically run an operating system which is a modified version of a mobile operating system designed for smart phones or tablet computers, and such an operating system may be generally called an operating system for wearable devices. Examples of such an operating system include Google Android Wear, Samsung's Tizen, Apple Watch OS. Such operating systems provide a user interface designed for reduced-size displays of smart watches and other wearable devices. This feature raises problems in usability of the wearable devices.

SUMMARY

According to an aspect, there is provided a method comprising: associating, by at least one processor of a wearable device, operation of a button of a user interface of the wearable device with a quick-launch function of a computer program application stored in the wearable device, wherein operation of the button in a state where the computer program application is not being executed and where an icon identifying and enabling launch of the computer program application is not being displayed causes launch of the computer program application; and detecting, by the at least one processor while the computer program application is being executed, operation of the button and, in response to the detection, causing execution of a function of the computer program application.

According to an aspect, there is provided an apparatus for a wearable device, comprising: at least one processor; and at least one memory including a computer program code, wherein the at least one memory and the computer program code are configured, with the at least one processor, to cause the apparatus to: associate operation of a button of a user interface of the wearable device with a quick-launch function of a computer program application stored in the at least one memory, wherein operation of the button in a state where the computer program application is not being executed and where an icon identifying and enabling launch of the computer program application is not being displayed causes launch of the computer program application; and detect, while the computer program application is being executed, operation of the button and, in response to the detection, cause execution of a function of the computer program application.

According to an aspect, there is provided a computer program product embodied on a non-transient distribution medium readable by a computer and comprising program instructions which, when loaded into an apparatus, execute a method comprising: associating operation of a button of a user interface of a wearable device with a quick-launch function of a computer program application stored in the wearable device, wherein operation of the button in a state where the computer program application is not being executed and where an icon identifying and enabling launch of the computer program application is not being displayed causes launch of the computer program application; and detecting, while the computer program application is being executed, operation of the button and, in response to the detection, causing execution of a function of the computer program application.

Some embodiments are defined in the dependent claims.

BRIEF DESCRIPTION OF THE DRAWINGS

In the following the invention will be described in greater detail by means of preferred embodiments with reference to the accompanying drawings, in which.

DETAILED DESCRIPTION

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1A:
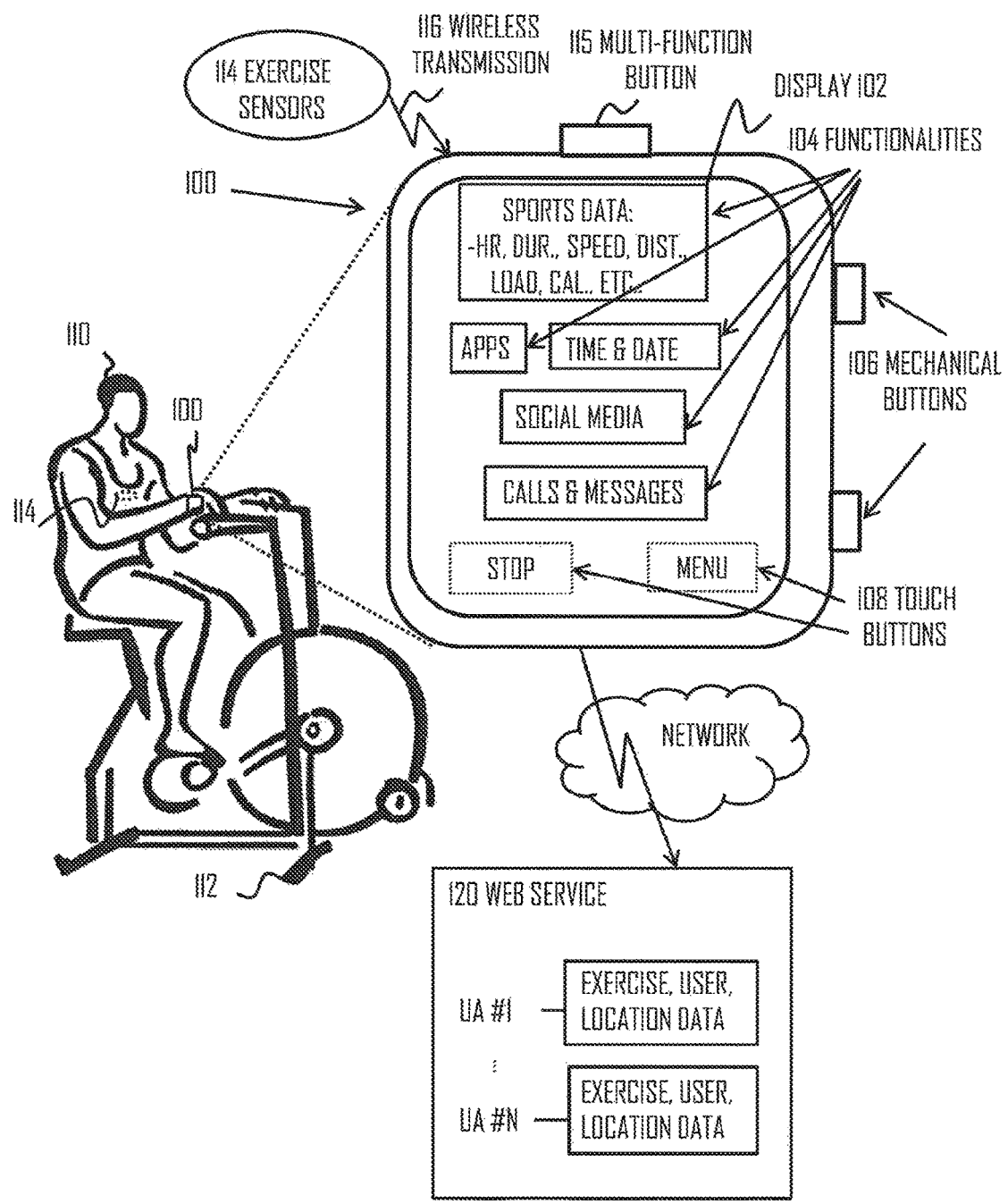
FIG. 1A illustrates a system comprising an apparatus according to an embodiment of the invention.

As shown in FIG. 1A, it is common to wear a personal training computer (TC) 100 during an exercise. The training computer 100 may be a wrist worn device, such as a smart watch. From the training computer 100, the exerciser 110 may monitor training parameters that characterize the physiological state during the exercise in real time. The physiological state may be detected from one or more performance metrics, such as by monitoring how the heart rate changes as the training session goes on.

In order to enable such monitoring, the training computer 100 may receive information from one or more physiological exercise sensors 114 worn by the user 110, such as heart rate-related information from a heart activity sensor (based e.g. on optical, electrical and/or pressure sensing), location specific information from a stride sensor or from a global positioning system (GPS) receiver, pace/speed related data from the GPS/stride sensor. Furthermore, sensors 114 may be installed in the exercise device 112, in case such is applied during the exercise. These sensors 114 integrated on the device 112 may comprise for example power sensors, distance sensors and cadence sensors.

In an embodiment, the training computer 100 comprises at least one physiological exercise sensor 114, such as the GPS receiver and/or an optical heart activity sensor. However, in an embodiment, at least one physiological exercise sensor 114 is an external sensor and not integrated in the training computer 100. The transfer of the exercise data from the external exercise sensors 114 to the training computer 100 may be performed wirelessly via a wireless link 116. The wireless communication link 116 may apply, e.g., WiFi, Bluetooth, Bluetooth low energy (BLE), or cellular network connection, to mention only a few possible options.

The following is a non-limiting list of possible types of exercise data (also known as physiological sensor data or as physical activity data) that may be detected by the sensor 114 or that the training computer 100 may determine on the basis of exercise data from the sensors 114: heart rate zones, heart rate samples, heart rate variation samples, heart beat interval samples, fat consumption rate, calorie consumption rate, consumed amount of calories, activity zones, activity samples, speed and/or pace samples, power samples, cadence samples, altitude samples, temperature samples, location samples, distance elapsed, time elapsed, pedal index, left-right balance, running index, training load, galvanic skin response samples, fluid balance, skin temperature samples, heading samples and/or bike angles. The location data may comprise satellite positioning data, such as, GPS positioning data, or any other data that allows the determination of the location of the exerciser during the exercise at any given time. The movement indoors may be detected via indoor location tracking methods, such as mapping techniques including measuring Earth's magnetic fields or radio frequency signals. The sensors 114 may comprise any sensors that are needed for detecting a given exercise data type, such as temperature sensor for detecting ambient temperature or skin temperature.

The training computer 100 may store the exercise data which the user (exerciser) 110 may use in post-analysis of the performed exercise. In an embodiment, the post-analysis is processed in the TC 100. In another embodiment, the exercise data is transferred from the training computer 100 and/or exercise sensor(s) 114 to a web service 120 located in a server of a network, and the post-analysis is carried out in the web service 120. In case the training computer 100 does not have a direct internet access capability, the training computer 100 may access the internet (e.g. the web service 120) via an external mobile phone coupled to the training computer 100, e.g., via a Bluetooth connection. The mobile phone may be associated to the same user 110 as the training computer 100.

The web service 120 may comprise exercise data user accounts (UA), each exercise data user account comprising exercise data associated with a specific user 110. As such, there may be different user accounts for different users (#1, #2, . . . , #N). An example of such a web service 120 may be a Polar Personal Trainer (PTT), Polar Flow or iFIT service which comprises a database for storing the plurality of user accounts. In an embodiment, the web service 120 may require that the users first connect to the web service 120 by applying a user name and a password, or other identification means. The training/exercise data at the user accounts may have been stored during or after the exercise. The user accounts may additionally store physiological data of the user and user attributes obtained from the exerciser and/or the exercise device, such as name, gender, age, weight, height, image, status, motto, fitness level, training schedule, maximum oxygen intake (VO2Max), maximum heart rate (HRMax), performance zones (heart rate zones, speed zones), aerobic and anaerobic thresholds.

The device 100 (e.g. a portable smart watch) comprises at least one processing unit and at least one memory including a computer program code, wherein the at least one memory and the computer program code are configured, with the at least one processing unit, to cause the device 100 to provide a variety of different functionalities 104, such as support for social media services (e.g. notifications), support for call and message indications (e.g. caller ID, incoming call/message notification), a variety of different applications (APPs), possible running on an operating system designed for wearable devices, e.g. Android Wear. Further, there may be a display 102 with touch sensitive capabilities supporting touch buttons 108 in addition to mechanical buttons 106.

One of the buttons of the device 100 may be a multi-function button 115 configured to provide multiple functions according to some embodiments of the invention. The multi-function button 115 may be a mechanical button such as buttons 106, or it may be a touch-sensitive button such as buttons 108. Embodiments of the multi-functionality are described below.

Figure 1B:
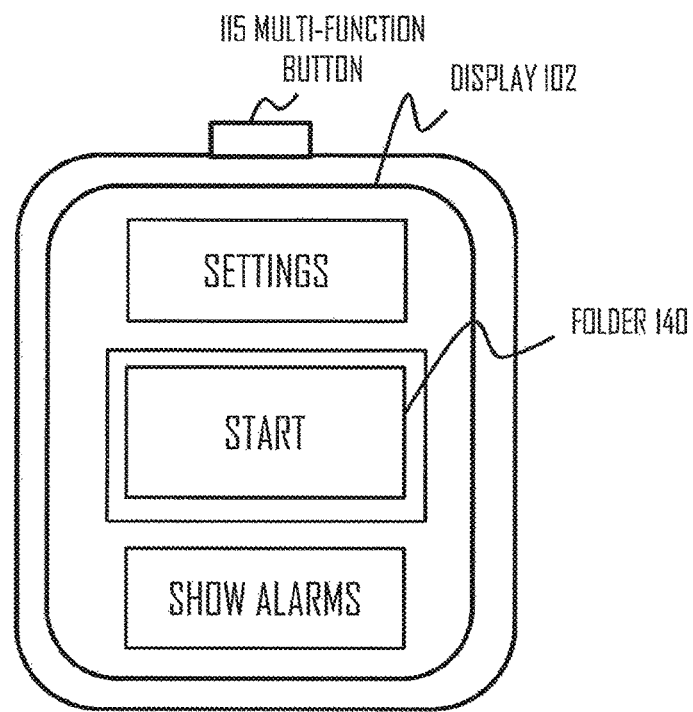
FIG. 1B illustrates user interface of the apparatus according to an embodiment of the invention.

As described in Background section, the limited display size of wearable devices, including wearable computers, reduces usability in some contexts. In an example of Android Wear device, only one or a few icons are visible at a time and the display may be scrolled only vertically or horizontally. FIG. 1B illustrates an example of such a display view. For example, up to three icons providing different functions or folders are visible at a time in the main menu: a settings folder, a start application folder 140, and a list of alarms. These folders are exemplary. In the presence of multiple icons, e.g. dozens, the burden of finding the correct icon becomes unbearably complex even if the operating system provides the icons in folders. A user wishing to launch an application in the device running Android Wear needs to perform the following operations: 1) scroll a long main menu to find a start menu storing executable applications; 2) select the start menu; 3) scroll the start menu to find the correct application; 4) select the application; and 5) launch of the application.

Figure 1C:
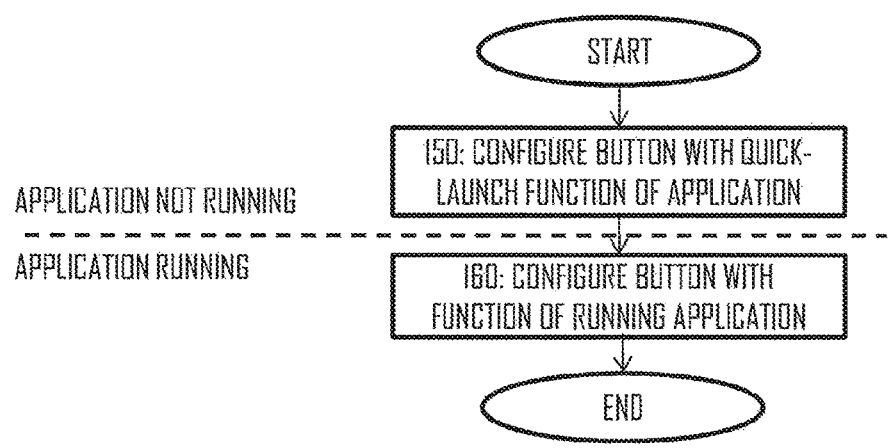
FIG. 1C illustrates a process executed in the apparatus according to an embodiment of the invention.

In embodiments where the device 100 is designed mainly for a determined type of purpose, e.g. as a sports watch, the user typically wishes to launch an application of that purpose, e.g. sports application. Some embodiments of the invention provide the above-mentioned multi-function button 115 that addresses such a problem of complex execution of the application. FIG. 1C illustrates a flow diagram according to an embodiment of the invention of the operation of the device 100, e.g. a wearable computer. The process of FIG. 1C may be executed by a processor operating as or in the wearable computer, e.g. the device 100.

Referring to FIG. 1C, a button of a user interface of the wearable device is associated with a quick-launch function of a computer program application stored in the wearable device, wherein operation of the button in a state where the computer program application is not being executed and where an icon identifying and enabling launch of the computer program application is not being displayed causes launch of the computer program application (block 150). In block 160, operation of the button is detected while the computer program application is being executed. In response to the detection, a function of the computer program application is executed.

In an embodiment, the button is the multi-function button 115. The button 115 may be associated with the quick-launch function of the computer program application while the application is not running and with the other function while the application is running. Such configuration enables quick launch of the computer program application without the need to navigate a complex menu structure to find the launch icon of the application, thus improving performance of the wearable device because operating time needed to launch the application is reduced.

In an embodiment, the multi-function button 115 is operable in most or even all states of the wearable device 100. In other words, the button 115 may be associated with an operable function in virtually all states of the device, e.g. when another computer program application is running, when no applications are running, and when a menu other than an application launch menu (e.g. settings menu) is being displayed.

In an embodiment, an operating system executed by the at least one processor provides a folder-based menu structure, wherein said icon of the computer program application is comprised inside at least one folder, wherein the quick-launch function enables the launch of the computer program application when contents of the folder are not being displayed.

In an embodiment, the function of the multi-function button when the application is being executed comprises triggering start of a measurement mode of the wearable device. The triggering may comprise activating at least one sensor of the wearable device 100 and/or at least one sensor external to the wearable device 100.

In an embodiment, the computer program application is for a primary purpose of the wearable device. Similarly, the function of the computer program application is also for the primary purpose of the wearable device in this embodiment. The primary purpose may be considered as the main use or main function of the wearable device. Sometimes, the primary purpose is defined by a commercial name or category of the wearable device, e.g. "a sports watch" or "an activity bracelet" indicates that the primary purpose of the wearable device is sports or physical activity measurements. In an embodiment, the primary purpose of the wearable device 100 is a physical activity measurement purpose.

In an embodiment, the device 100 is configured to enter a limited operation mode by deactivating at least one layer of an operating system of the wearable device while the computer program application is being executed. In the limited operation mode, a limited set of functions are available, and the function of the button 115 described in block 160 is comprised in the limited set of functions. Let us next describe some details of the limited operation mode.

In a long lasting operation, such as during a physical activity session (e.g. during an exercise), the power consumption of the device 100 is critical. In case the battery runs out before the end of the exercise, the user 110 may not be able to record all the exercise data throughout the training. This is not desired.

Figure 2A:
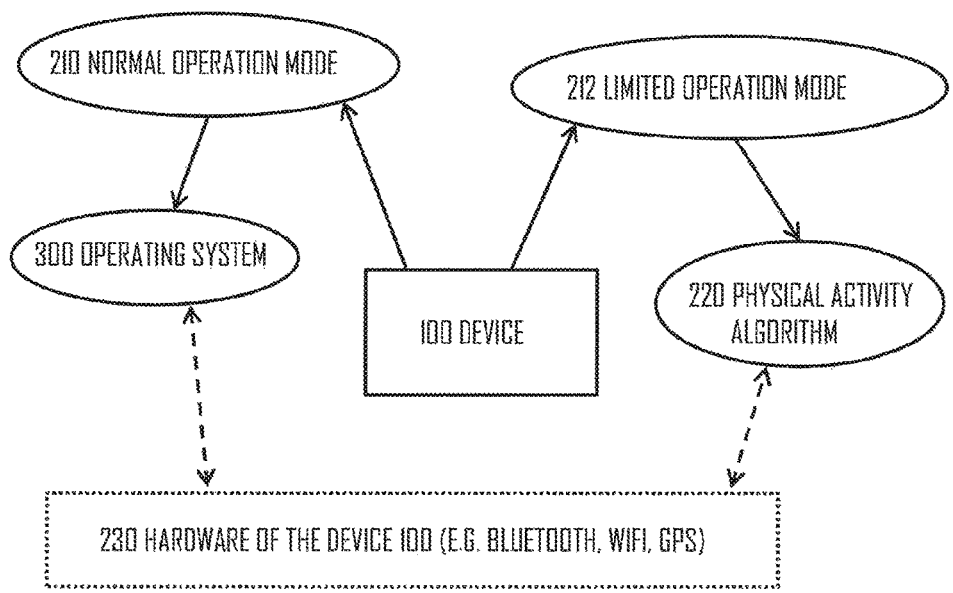
FIGS. 2A and 2B illustrate operational modes of the apparatus according to an embodiment of the invention.
Figure 2B:
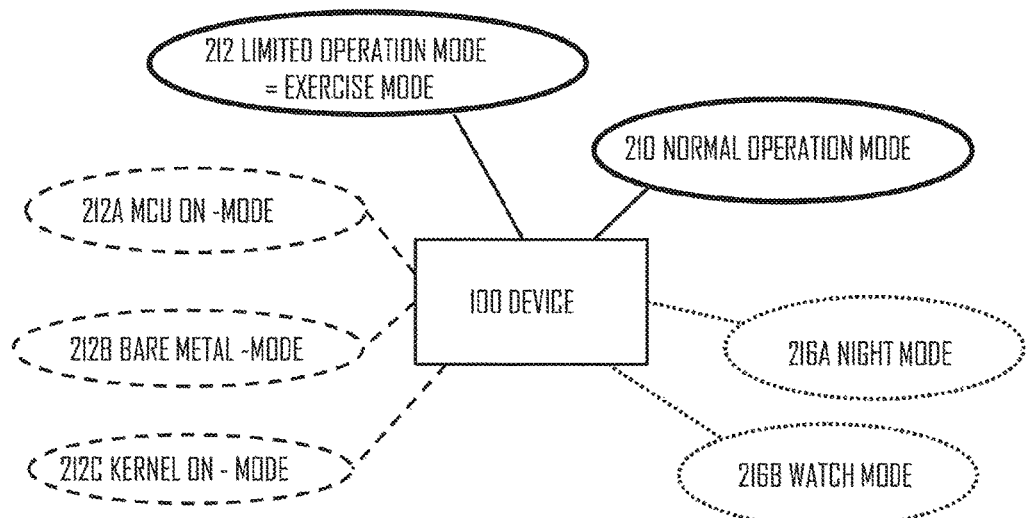

Therefore, it is proposed, as shown in FIGS. 2A and 2B, that the device 100 supports a normal operation mode 210 and the limited operation mode 212. In order to optimize the power consumption of the device while providing all needed functionalities 104 to the user 110 of the device 100, the device 100 may switch between the normal operation mode 210 and the limited operation mode 212. The power consumption of the device 100 during the limited (operation) mode 212 may be smaller for a given task than during the normal (operation) mode 210. Thus, the limited operation mode 212 may be used when smaller power consumption is needed and a smaller amount of available functionalities 104 is enough, whereas the normal operation mode 210 may be applied when larger set of functionalities 104 is needed.

In an embodiment, during the normal operation mode 210, the functionalities 104 of the device 100 are available through an operating system (OS) 300 of the device 100. The operating system 300 may comprise a plurality of layers including a kernel and library function layer, as will be described later.

During the limited operation mode 212, the device 100 may execute at least a physical activity algorithm (PAA) 220 based on physical activity data corresponding to a physical activity session performed by the user 110 of the device 100. However, here the physical activity algorithm 220 may apply a direct low-level hardware access bypassing at least the layers of the operating system 300 which are above the kernel and the library function layer.

On the contrary, the hardware access in the normal mode 210 may go through the plurality of layers of the operating system 300, as the application layer is typically on top the OS layer stack. Therefore, in case the PAA 220 was run in the normal operation mode 210, the PAA 220 would apply the plurality of layers of the operating system 300 for hardware access.

In an embodiment, the device 100 is a portable or wearable device, such as a smart watch. In an embodiment, the device 100 is a sports watch. In an embodiment, the device 100 is a training computer.

Figure 3:
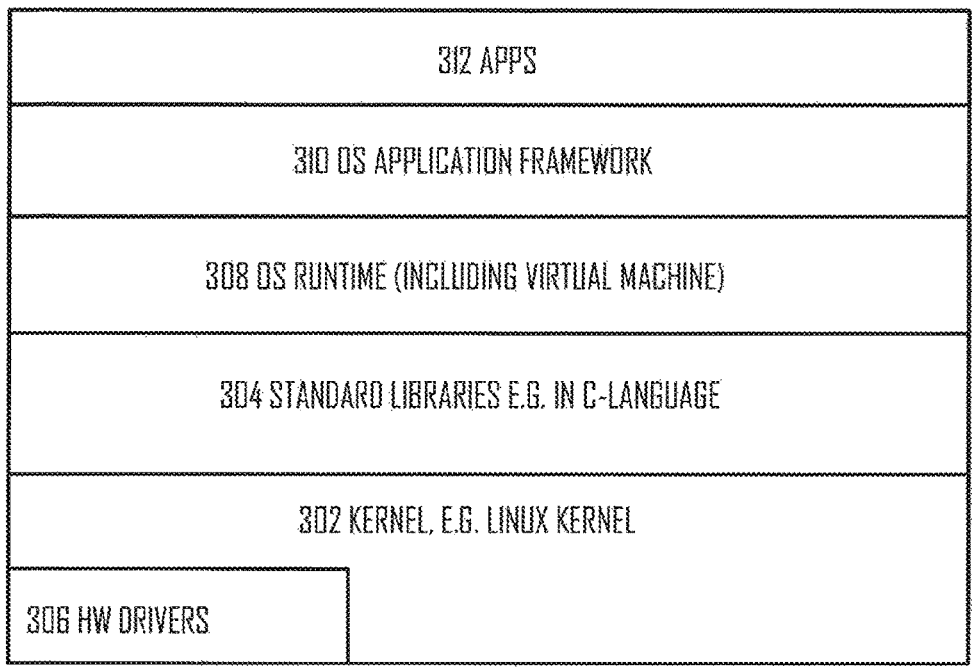
FIGS. 3 and 4 illustrate a stack of operational layers in the apparatus according to an embodiment of the invention.

An example operating system 300 is shown in FIG. 3. As shown, the operating system 300 comprises a layered hierarchy. Although the operating system 300 may be any operating system, such as Android, Android Wear, iOS, Apple Watch OS, Tizen, BSD, Linux, OS X, QNX, Microsoft Windows, Windows Phone, or IBM z/OS, for the reasons of simplicity, the description will assume that the operating system 300 is Android.

Let us take a look at the layers of the example operating system 300. In an embodiment, the OS 300 is built on top of a kernel 302. In case of Android operating system 300, the kernel is a Linux kernel 302. The kernel 302 may be seen as the core of the operating system 300. The kernel 302 may comprise, e.g., memory management programs, security settings, and power management software.

The kernel 302 further provides access to the hardware 230 upon a request by an application, for example. In order to do this, the kernel 302 may comprise HW drivers 306. A hardware driver is a computer program that controls a particular type of hardware that is attached to the device. In an embodiment, the HW drivers 306 comprise a driver for the display 102. In an embodiment, the HW drivers 306 comprise a driver for a camera of the device 100. In an embodiment, the HW drivers 306 comprise a driver for enabling a Bluetooth and/or Bluetooth low energy communication to/from the device 100. In an embodiment, the HW drivers 306 comprise a driver for enabling a wireless local area network (WLAN/WiFi) communication to/from the device 100. In an embodiment, the HW drivers 306 comprise a driver for a flash memory drive of the device 100. In an embodiment, the HW drivers 306 comprise a universal serial bus (USB) interface of the device 100. In an embodiment, the HW drivers 306 comprise a driver for a user interface, such as mechanical keys/buttons, of the device 100. In an embodiment, the HW drivers 306 comprise a driver for audio output of the device 100. In an embodiment, the HW drivers 306 comprise a driver for a power management unit of the device 100. In an embodiment, the HW drivers 306 comprise a driver for a binder of an inter-process communication (IPC) interface of the device 100.

In an embodiment, the drivers required for running the PAA 220 during the limited operation mode 212 may comprise a driver for the display 102. required for running the PAA 220 during the limited operation mode 212 may comprise a driver for enabling a Bluetooth and/or Bluetooth low energy communication. In an embodiment, the drivers required for running the PAA 220 during the limited operation mode 212 may comprise a driver for the WLAN/WiFi communication. In an embodiment, the drivers required for running the PAA 220 during the limited operation mode 212 may comprise a driver for a user interface. In an embodiment, the drivers required for running the PAA 220 during the limited operation mode 212 may comprise a driver for a power management unit. The kernel 302 may comprise some memory which is reserved for the parts of the operating system 300 that have to stay in the memory and may be off-limits to any other software. The device 100 may store, e.g., a Bootloader, such as uBoot or Fastboot. The bootloader may be a computer program that loads the main operating system 300 or runtime environment for the device 100.

The next level on top of the kernel 302 may be a standard library functions layer 304. The library functions 304 may comprise standard library instructions. The libraries 304 may comprise a set of instructions written e.g. on C or C++ language that tell the device 100 how to handle different kinds of data. Some of these libraries handle tasks related to graphics, multimedia codecs, database and browsers (e.g. WebKit). As an example, a media framework library supports playback and recording of various audio, video and picture formats.

An Android runtime layer 308 includes a set of core Java libraries. This layer may also include a virtual machine, such as a Dalvik virtual machine or Android Run Time (ART) in case of Android. The virtual machine is a software application that behaves as if it were an independent device with its own operating system. For example, the Android OS may use the virtual machine to run each application as its own process. This may be needed as native Android Java libraries are different from standard Java or Java Mobile Edition (JME) libraries. JME is an adaptation of Java Standard Edition to allow Java to run on embedded devices, such as mobile phones.

An application framework layer 310 may manage the device's 100 basic functions, such as e.g. resource allocation, switching between processes or programs and keeping track of the devices 100 physical location. At the top of the layer stack of the operating system 300 are the application layer 312, comprising one or more applications. This layer 310 may be seen as the layer with which the user 110 interacts with while being unaware of all the action taking place beneath this layer 310. Some applications are pre-installed on the device 100 while some may be downloaded from the Internet, such as from the Android market or a private store.

In an embodiment, there is only one operating system 300 in the device 100. In an embodiment, the operating system 300 is Android or Android Wear built on top of Linux kernel 302. In another embodiment, the operating system 300 is iOS built on top of XNU kernel 302. In an embodiment, the operating system 300 is Windows built on top of Windows 9x/NT kernel 302.

During the normal operation mode 210, the device 100 may access the full operating system 300 including all the layers of FIG. 3. However, running the Android, or any other operating system, may consume a significant amount of power. For example, running the Android 300 with the Linux kernel 302 may require e.g. 512 MB of memory. As such large amount of memory is needed, most power efficient memories may not be feasible due to high expenses. Therefore, cheaper, more power consuming memory types are used. Let us now take a look at different types memories used in computing devices.

Cache: Caches are designed to alleviate the bottleneck of slow memory access by making the data used most often by the processing unit readily available without accessing external main memory units. This may be accomplished by building a small amount of memory, known as primary or level 1 cache, into the processing unit. Typically, the size of the level 1 cache is small, ranging between 22 kilobytes (kB) and 128 kB. The secondary or level 2 cache is typically larger and resides on a memory card located near the processing unit. The level 2 cache may have a direct connection to the processing unit.

RAM: RAM stands for Random Access Memory. RAM is typically referred to as the main memory. RAM is a read/write-type of memory. It is considered fast and is used to store data and programs which a computer processor is currently processing and needs to have easily to hand. RAM is volatile in that it loses its contents when the power is switched off. The RAM may be beneficial because most data on computers is stored in slower "storage media" such as hard disks, solid state drives or flash memory. Therefore, the processing unit may need to copy the programs or data to be used into the RAM. Consequently, the higher the RAM size the faster is your computing device. However, RAM, and especially static RAM, is a relatively expensive memory type. There are two types of RAM, dynamic RAM (DRAM) and a static RAM (SRAM).

Dynamic RAM (DRAM) need to be refreshed frequently. It is not as expensive as SRAM but consumes more power for a given task.

Double data rate synchronous dynamic RAM (DDR SDRAM or simply DDR) is a type of DRAM. It is cheaper than SRAM, but consumes more power for a given task, at least partly because it is a capacitive memory.

SRAM (static RAM) may be used, e.g., as the cache memory. Unlike DRAM, SRAM does not have to be refreshed. Without the need for constant refreshing, SRAM may operate quickly. But the complexity of the memory unit may make it prohibitively expensive for use as the standard RAM. Further, SRAM may require only little power as no constant refreshing is needed. As an example, a given task performed with SRAM requires less power than the same task computed with DRAM. Static RAM may exists as integrated on a chip, such as on microprocessor units (MPU) and microcontroller units (MCU) as a dedicated RAM or as cache memory, or on application specific integrated circuits (ASICs).

ROM stands for Read Only Memory. It is non-volatile and used to store data which will not need to change, such as software to start up and run an electronic device or for the basic start-up functions of a device.

Flash memories are a type of non-volatile ROM memories. The flash memory may of a serial flash type. A serial is a low-power flash memory that uses a serial interface for sequential data access. When incorporated into an embedded system, serial flash requires fewer wires on the PCB than parallel flash memories, since it transmits and receives data one bit at a time. This may permit a reduction in board space, power consumption, and total system cost.

As DDR memories are cheaper than SRAM memories, they are typically used as the main RAM for driving the operating system 300 (such as Android+Linux kernel). This may cause high power consumption. In an embodiment, the normal operation mode 210 is defined as an operation mode during which the DDR memory of the device 100 are active. In an embodiment, during the normal operation mode 210, hardware access takes place through the layers of the operating system 300, including layers which are above the kernel 302 and the library function layer 304.

Therefore, it may be advantageous to switch into the limited operation mode 212 of the device 100, in which the hardware access does not go through all the layers of the operating system 300 but applies the direct low level hardware access between the PAA 220 and the predetermined hardware required by the PAA 220.

In an embodiment, the direct low-level hardware access comprises an access between a predetermined set of hardware and one of the following: a kernel of the operating system and the at least one processing unit. Thus, in an embodiment, the PAA 220 accesses the HW 230 via the kernel 302. As said, the kernel 302 may have direct access to the device drivers 306 for controlling the HW 230. In one embodiment, however, the kernel 302 may be inactive. In such case, the direct low level HW access may take place directly between the processing unit executing the PAA 220 and the HW 230 via the device drivers 306.

The predetermined set of hardware 230 that may need to be accessed during the execution of the PAA 220 may include e.g. communication enabling HW, such as Bluetooth (BLT), Bluetooth low energy (BLE), and/or WiFi, for reception of sensor data from external sensors, and location tracking enabling HW, such as a GPS receiver, for receiving location tracking data, to mention only a few non-limiting examples. Further, in an embodiment, near field communication (NFC)/radio frequency identification (RFID) may be activated.

In an embodiment, the device 100 may deactivate at least predetermined layers of the operating system 300 when entering the limited operation mode 212. These layers of the operating system 300 may comprise at least the layers above the library functions layer 304, as shown with dots in FIG. 4. However, in an embodiment, all the layers above the kernel 302 are switched off (deactivated). Yet, in one embodiment, all the layers, including the kernel 302, are deactivated. In an embodiment, during the limited operation mode 212, at least the applications layer 312 is inactivated. In an embodiment, during the limited operation mode 212, at least the application framework layer 310 is deactivated. In an embodiment, during the limited operation mode 212, at least the OS runtime layer 308 is deactivated. In an embodiment, during the limited operation mode 212, at least the library functions layer 304 is deactivated. In an embodiment, during the limited operation mode 212, at least the kernel layer 302 is deactivated. Switching off at least some of the layers and at least partly deactivating the operating system 300 may provide for reduced power consumption. This may be, e.g., because the high power consumption memory units, such as the DDR memory, may be switched off.

In an embodiment, the clock frequency of the device 100 is decreased for the limited operation mode 212 so as to decrease the power consumption rate.

Figure 4:
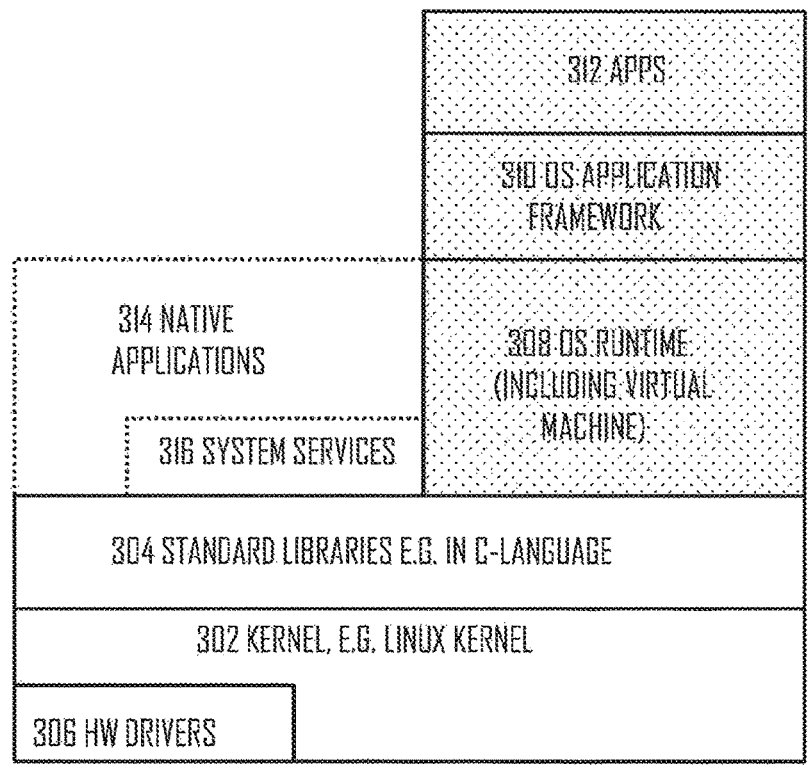

FIG. 4 also shows how native applications 314 and system services 316 may be located in the hierarchy of the OS 300. Native applications 314 may comprise software which is arranged to be run by the specific operating system, in this case for the Android OS 300. Because the native applications are written for a specific platform, they may interact with the operating system features and other software that is typically installed on that platform. For example, the native application 308 may use device-specific hardware and software. A native application may be pre-stored on the device 100 or it can be downloaded from a public or private store and installed on the device 100.

System services 316 may comprise necessary services for the operation of the device 100. There may include services, such as program execution e.g. for allocating and de-allocating memory, CPU scheduling in case of multi-tasking, I/O operation handling e.g. for providing input/output to applications, file system manipulation e.g. for writing data into new files or input taken from some files, communication handling e.g. for enabling communication between different processes, and error detection e.g. for monitoring the system for errors.

As shown in FIG. 4, these layers 314 and 316 are on the same level as the OS runtime layer 308. However, these native applications 314 may be run, with the aid of system services 316, without needing to operate the full OS 300 of the device 100.

In an embodiment, a set of functionalities of the apparatus is available to the apparatus during the normal operation mode 210 and only a predetermined subset of the functionalities is available to the apparatus during the limited operation mode 212. Therefore, switching some of the layers off may denote that the set of functionalities available to the user is larger in the normal operation mode 210 than in the limited operation mode 212. For example, applications locating in applications layer 312 of the operating system 300 may be inaccessible during the limited mode 212. These may include e.g. web applications downloaded to the device 100. However, the user may desire to use the full set of applications. Therefore, it is not feasible to apply the limited operation mode with a lower power consumption rate constantly. It may be noted though that the same functions run during the limited mode 212 may also be run in the normal operation mode 210. However, the application for providing the functionality may be different. In the limited mode it may be provided by the PAA 220, whereas in the normal mode the functionalities of the PAA 220 may be provided by another application, such as an Android application. The power consumption for a given task during the normal mode 210 may be higher than the power consumption for the same task during the limited mode 212. Thus, the switch between the two modes 210 and 212 may be made in order to optimize the power consumption of the device 100, yet taking into account the needs of the user 110 of the device 100.

Figure 5:
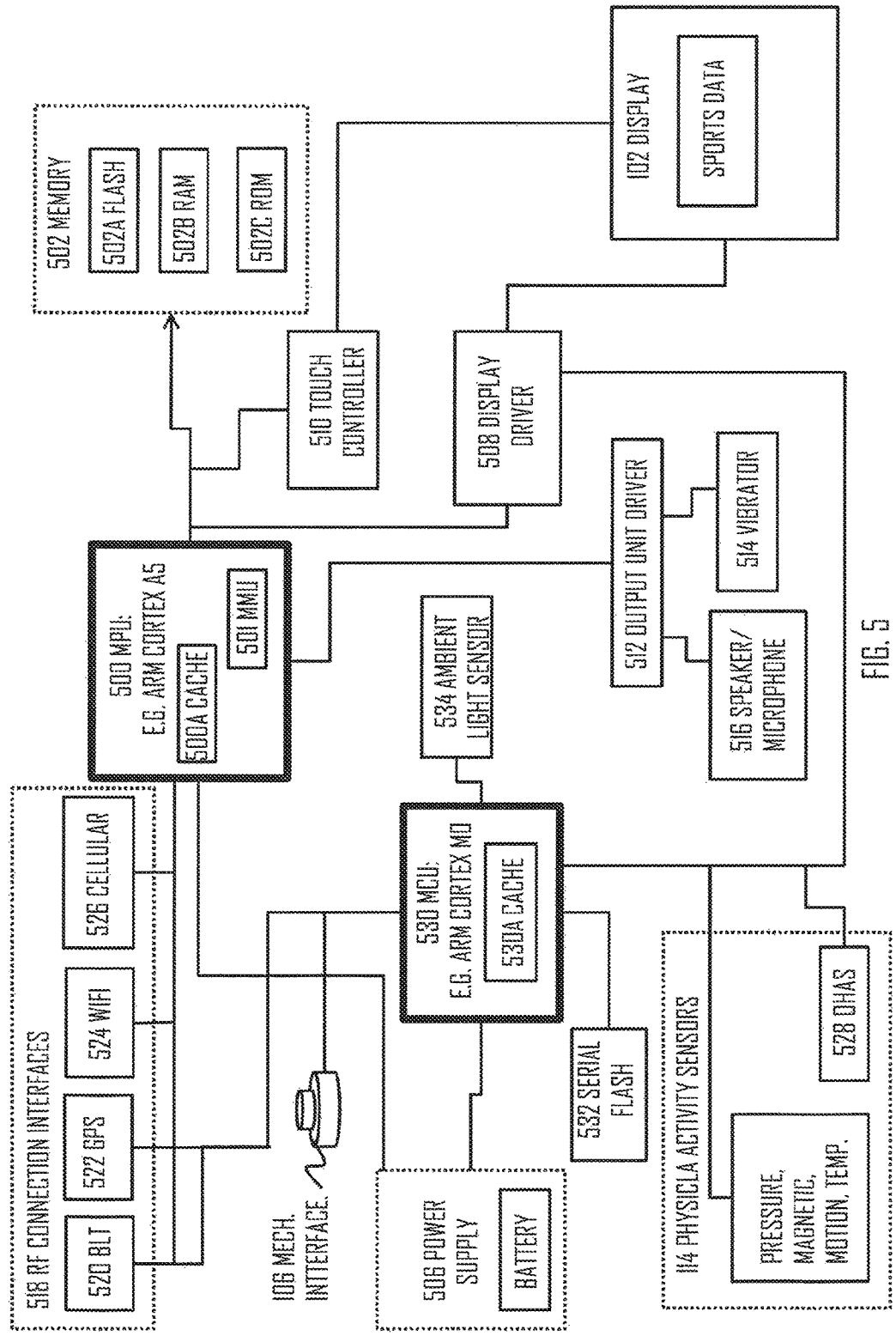
FIG. 5 illustrates a block diagram comprising physical circuitries of the apparatus according to an embodiment of the invention.

Let us next look at example hardware architecture of the device 100 with reference to FIG. 5. The device 100 may comprise a microprocessor unit (MPU) 500, also known as the central processing unit (CPU). In an embodiment, the model of the MPU 500 may be, e.g. ARM cortex A5.

The MPU 500 may comprise integrated memory 500A (such as SRAM which is relatively expensive but has relatively low power consumption rate) for relatively fast execution of functionalities with relatively low power consumption. In an embodiment, the integrated memory 500A is used as cache memory. However, there may be other purposes for the integrated memory 500A, as will be described.

Further, the MPU may access a memory unit 502 comprising, e.g., non-volatile flash memory 502A, which may be used for storing files/data that is often referenced, but rarely modified, such as application and operating system executable files. The flash memory 502A may be of serial type. In an embodiment, upon booting of the device 100, the MPU 500 may read the data on the flash drive in order to find the operating system data required for triggering the operation system on. This may provide for faster booting than via the normal ROM 502C. The memory unit 502 may further comprise volatile RAM memory 502B, such as DDR memory which is relatively cheap but has relatively high power consumption. The size of the RAM may be, e.g. 128 MB (megabytes). Finally, the memory unit 502 may comprise non-volatile ROM memory 502C, which may have a size of a few gigabytes (GB). The memory unit 502 may store data related to user applications and data required for activating the operating system 300 of the device 100.

The device 100 may comprise a power supply 506, including a disposable battery or a rechargeable battery. The power supply 506 may have a limited power capacity and after the battery has run out of power, it needs to be replaced or recharged. In an embodiment, the battery is a lithium polymer (LiPo) battery. The power supply 506 may provide power for the MPU 500 and for the other hardware of the device 100. In an embodiment, the power supply 506 may at least partially recharge itself on the basis of motion or solar power, for example. The power supply 506 may also comprise power management unit The MPU 500 may connect to HW 230 via the operating system's kernel 302. In an embodiment, the MPU 500 may be coupled to the display 102 of the device 100 via a display driver 508. In an embodiment, the display 102 may be a touch sensitive display, wherein the touch sensitive functionality may be controlled (e.g. activated/inactivated) by the MPU 500, possibly via a touch controller 510.

In an embodiment, the MPU 500 may be coupled to an output driver 512. The output driver 512 may control, e.g. a vibrator 514 for causing vibration motion of the device 100 and/or a speaker 516 for outputting audio signals from the device 100. There may also be a microphone in the device 100 for reception of audio commands from the user. The output driver 512 may also provide an electric pulse to the skin of the user 110.

In an embodiment, the MPU 500 may connect to radio frequency (RF) connection interfaces 518. These may be used for providing connection capabilities for the device 100. In an embodiment, the device 100 comprises a BLT or BLE interface 520 for providing communication capabilities to/from the device 100 via BLT/BLE technique. In an embodiment, the device 100 comprises a GPS receiver 522 for receiving GPS signal in order to perform location tracking of the device 100. In an embodiment, the device 100 comprises a WiFi interface 524 for communication on WLAN or in wireless personal area network (WPAN). In an embodiment, the device 100 comprises a cellular interface 526 for performing communications via a cellular access. A skilled person may understand that the device 100 may comprise also other communication interfaces, such as interfaces based on ANT or ANT+ by Dynastream. Other device-to-device communication protocols are equally possible.

The device 100 may connect via the RF connection interface 518 to a mobile phone carried by the user 110 so as to communicate with the mobile phone. For example, the mobile phone may send notifications to the device 100, such as a wrist device, regarding incoming email, calls, messages, social media updates.

In an embodiment, the device 100 comprises physical activity sensors 114. In an embodiment, the physical activity sensors 114 comprise an optical heart activity sensor (OHAS) 528 for optically measuring the heart activity of the user 110. As an alternative or in addition to, the heart activity detection may take place electrically in which case the device 100 may receive heart activity data may be received via one of the RF connection interfaces 518 from the electrical heart activity sensor. In an embodiment, the physical activity sensors 114 comprise an accelerometer for determining motion of the device 100. The accelerometer may be a three-dimensional accelerometer capable of detecting motion in each direction of a three dimensional coordinate system. In an embodiment, the physical activity sensors 114 comprise a gyroscope for further detecting motion and/or orientation of the device 100. In an embodiment, the physical activity sensors 114 comprise a magnetic sensor (e.g. a three-axis magnetometer) for detecting orientation of the device 100 on the basis of earth magnetic fields. In an embodiment, the physical activity sensors 114 comprise a pressure sensor for detecting ambient pressure. This may indicate the height information, e.g. with respect to predetermined level such as sea level. In an embodiment, the physical activity sensors 114 comprise a temperature sensor for determining ambient and/or device's internal temperature. Other physical activity sensors may be available as well, such as an ambient light sensor, a humidity sensor, and/or an electric field sensor on the screen. These additional sensors may be, as said earlier, worn by the user 110 or integrated into an exercise device, such as on a treadmill or on a bicycle, in which cases the physical activity data may be received via the RF connection interfaces 518 from the corresponding physical activity sensor. In an embodiment, although not shown in FIG. 5, the device 100 may comprise a proximity sensor for sensing the proximity of the device 100 with another device.

In an embodiment, the device 100 further comprises a microcontroller unit (MCU) 530. In an embodiment, the MCU 530 may be of an ARM cortex M0 type. In an embodiment, unlike the MPU 500, the MCU 530 may not be equipped with a memory management unit (MMU) 501. The MMU 501 is a computer hardware unit having all memory access passed through itself. Therefore, the MMU 501 may perform the translation of virtual memory addresses to physical addresses. For example, Linux kernel 302 may require the MMU to operate. As a result, in an embodiment, the MPU 500 may be able to drive the kernel 302, whereas the MCU 530 is not able drive the kernel 302. As the kernel 302, such as the Linux kernel is not run on the MCU 530, the MCU 530 may not be able to run the Android operating system 300, for example, whereas the MPU 500 may run the Android operating system 300.

The MCU 530 may be seen as a chip which is used to control the device at least partially. It is a type of microprocessor emphasizing self-sufficiency and cost-effectiveness, in contrast to a general-purpose MPU 500. In an embodiment, the MCU 530 may comprise all the memory and interfaces needed for a predetermined application(s), whereas the MPU 500 typically requires additional chips to provide these functions.

In an embodiment, the MCU 530 may comprise integrated memory 530A for data storage. The integrated memory 530A may be an internal memory integrated within the MCU 530. In an embodiment, the integrated memory is built on SRAM, which has relatively low power consumption with relatively fast response. The MCU 530 may be coupled to internal or external program storage unit, such as a flash memory 532, or some other type of non-volatile memory. The flash memory 532 may be of serial type. In an embodiment, the integrated memory 530A is used as cache memory. However, there may be other purposes for the integrated memory 530A, as will be described.

However, in an embodiment, the MCU 530 may not comprise any DRAM memory, such as DDR memory. This may ensure low power consumption for a given task when compared to the power consumption of the MPU 500 for the same task. However, this may also limit the availability of features accessible when the device is running by the MCU 530.

The connections between different components of the device 100 in FIG. 5 may be wired. For example, the connections may be based on an inter-integrated circuit (I2C) bus, integrated interchip sound (I2S) bus, a serial peripheral interface (SPI) bus. The buses may utilize, e.g., RS-232, a general-purpose input/output (GPIO), and/or universal asynchronous receiver/transmitter (UART) for translating data between parallel and serial forms. For example, an I2C or an SPI bus may be set up between the MPU 500 and the MCU 530 in order to enable control and/or data communication between these two processing units.

In an embodiment, the MPU 500 is deactivated in the limited operation mode, and the MCU 530 operates as the processor of the device 100. In the normal operation mode, at least the MPU 500 may be activated but, in some embodiments, also the MCU 530 may be running processes. Accordingly, the MPU 500 or the MPU 500 together with the MCU may operate as the processor described herein.

Figure 6:
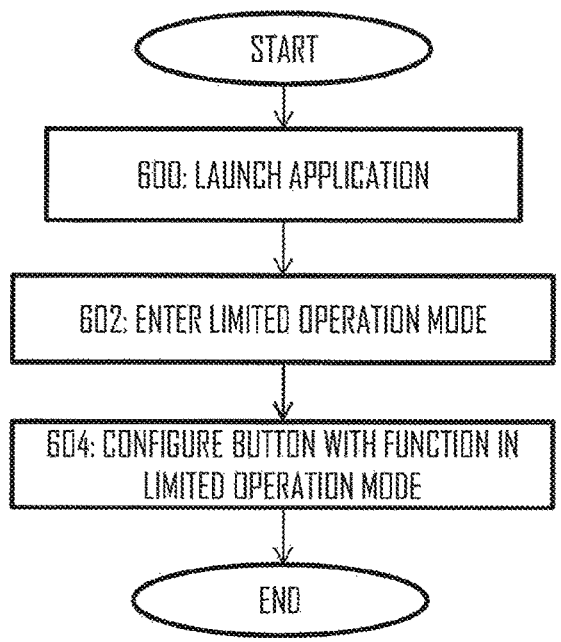
FIG. 6 illustrates configuration of a multi-function button of the apparatus in connection with a limited operation mode according to an embodiment of the invention.

FIG. 6 illustrates an embodiment for configuring the button 115 in the limited operation mode. Referring to FIG. 6, the application is launched in block 600, e.g. through operation of the multi-function button 115. After the application has been launched, the function of the multi-function button may be changed. In block 602, the limited operation mode is entered. In an embodiment of block 602, the processor of the device 100 may enter the limited operation mode upon starting a measurement mode. In the measurement mode, the PAA 220 may be executed, and the device 100 may receive measurement data from one or more sensor devices, and process the measurement data into performance metrics such as heart rate, energy expenditure, traveled distance, or speed. In the measurement mode, the processor may operate at least one sensor device and configure the sensor device to carry out measurements, acquire measurement data, and transfer the measurement data to the processor for said processing.

In another embodiment, the processor enters the limited operation mode upon detecting a determined event, e.g. decrease of battery capacity to or below a determined threshold level.

In block 604, upon entering the limited operation mode, the processor may configure the multi-function button with a function of the limited operation mode. An example of such a function is a pause in the measurement mode. Another example of such a function is marking end of a lap and start of a new lap, e.g. during a running or cycling exercise. Yet another example of the function is transmission of a wireless communication signal to a cellular phone communicating with the device 100, wherein the wireless communication signal comprises a message triggering acceptance of an incoming voice call. In this example, a Bluetooth connection between the device 100 and the cellular phone may be operational in the limited operation mode. Upon receiving an incoming call in the cellular phone, the cellular phone may transfer a notification of the incoming call to the device 100 over the Bluetooth connection, and the device 100 may alarm the user of the incoming call in the limited operation mode. The alarm may be a visual alarm or an audible alarm output by the device 100. Upon detecting the user operating the multi-function button while outputting the alarm, the processor may cause the transmission of the wireless communication signal to the cellular phone to accept the call.

The functions of block 604 may bypass at least one higher layer of the stack of FIG. 3, e.g. at least one layer on top of the library and kernel layers 304, 308. Such bypassed layer(s) may be deactivated in the limited operation mode and controls are directed directly to at least one device driver controlling hardware of the wearable device 100. In some functions of the multi-function button 115 in the limited operation mode, processes of the kernel and/or libraries are employed.

In an embodiment, the multi-function button 115 is configured with a plurality of context-sensitive functions, each function associated with a different operational context of the wearable device. The plurality of functions may be provided while the application is running. The processor may determine a context in which the operation of the button has been detected and execute, as a response to the operation of the button, a function associated with the determined context.

Figure 7:
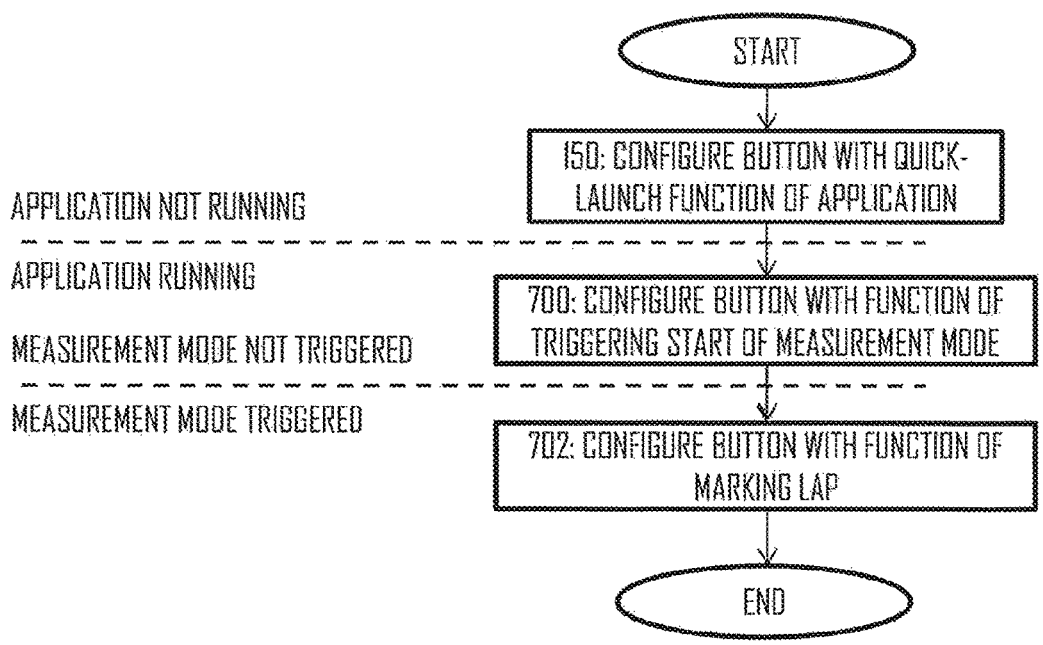
FIG. 7 illustrates context-sensitive configuration of the multi-function button according to an embodiment of the invention.

Let us next describe an embodiment of the context-sensitive operation of the multi-function button 115 with reference to FIG. 7. One context may be a state where the application is not running in the device 100. While the processor is not executing the application, the processor may configure the multi-function button with the quick-launch function of the application (block 150). In an embodiment, a plurality of contexts is defined for a state where the application is running. Referring to FIG. 7, one context may be related to the measurement mode. For example, when the measurement mode is not triggered, a function of the multi-function button may be triggering the measurement mode (block 700). Accordingly, upon detecting operation of the multi-function button in the state where the application is running but the device 100 is not in the measurement mode, the processor may trigger the start of the measurement mode (block 700).

When the measurement mode has been triggered and the device 100 is in the measurement mode, the multi-function button may be configured with a function different from the triggering of the measurement mode. In an embodiment, the function is marking the lap, as described above. Upon detecting the operation of the button 115 in the context where the device 100 is in the measurement mode, the processor may trigger marking of end of one lap and start of a new lap. The mark may categorize measurement data associated with different laps, e.g. by marking a lap in which each measurement data has been acquired. In an embodiment, this function of the button 115 may be triggered only in a subset of measurement modes of the device 110, e.g. in measurement modes associated with sports that are applicable to lapped exercises such as running or cycling.

In an embodiment, the function of the button in the measurement mode is ending the measurement mode.

In a further embodiment of the context-sensitivity, an instantaneous event may override the current function of the multi-function button. Such an instantaneous event may be triggered by reception of a signal or message from another device, e.g. over communication connection. Such a signal may indicate an incoming voice call, for example. At one time instant, the function of the multi-function button 115 may be the quick-launch function or any function described in connection with FIG. 7. Upon receiving the signal or the message indicating, for example, the incoming voice call, the processor may switch the function of the multi-function button 115 from the quick-launch function (or another function) to the function where the operation of the button 115 causes transmission of the signal indicating acceptance of the incoming voice call. As a consequence, the operation of the button 115 may cause the cellular phone to connect to a network in order to connect the phone call. Upon operating the button during the instantaneous event or upon expiry of the event, the processor may reconfigure the multi-function button with the function that was used just before the instantaneous event.

As used in this application, the term "processor" refers to all of the following: (a) hardware-only circuit implementations such as implementations in only analogue and/or digital circuitry; (b) combinations of circuits and software and/or firmware, such as: (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of "processor" applies to all uses of this term in this application. As a further example, as used in this application, the term "processor" would also cover an implementation of merely a processor (or multiple processors) or portion of a processor, e.g. one core of a multi-core processor, and its (or their) accompanying software and/or firmware. The term "processor" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in connection with FIGS. 1 to 7 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
    associating, by at least one processor of a wearable device, operation of a button of a user interface of the wearable device with a quick-launch function of a computer program application stored in the wearable device, wherein operation of the button in a state where the computer program application is not being executed and where an icon identifying and enabling launch of the computer program application is not being displayed causes launch of the computer program application;
    detecting, by the at least one processor while the computer program application is being executed, operation of the button; and
    in response to the detection, causing execution of a function of the computer program application, the function comprising:
        activating at least one sensor of the wearable device and/or at least one sensor external to the wearable device; and
        triggering a start of a measurement mode of the wearable device, in which measurement data is received at the at least one processor from the at least one sensor.

2. The method of claim 1, further comprising providing, in an operating system executed by the at least one processor, a folder-based menu structure, wherein said icon of the computer program application is comprised inside at least one folder, wherein the quick-launch function enables the launch of the computer program application when contents of the folder are not being displayed.

3. The method of claim 2, wherein the operating system is a mobile operating system configured for wearable devices comprising a user-interface configured for reduced-size displays of wearable devices.

4. The method of claim 1, further comprising:
    providing the button with a plurality of context-sensitive functions, each function associated with a different operational context of the wearable device;
    determining a context in which the operation of the button has been detected; and,
    executing, as a response to the operation of the button, a function associated with the determined context.

5. The method of claim 1, wherein the function of the computer program application comprises causing transmission of a wireless communication signal to a cellular phone communicating with the wearable device, the wireless communication signal comprising a message triggering acceptance of an incoming voice call.

6. The method of claim 1, further comprising while the computer program application is being executed:
    entering a limited operation mode by deactivating at least one layer of an operating system of the wearable device, wherein a limited set of functions are available in the limited operation mode, and wherein the function of the computer application is comprised in the limited set of functions.

7. The method of claim 6, wherein the function of the computer application bypasses said at least one deactivated layer and controls directly at least one device driver controlling hardware of the wearable device.

8. The method of claim 1, wherein the computer program application is for a primary purpose of the wearable device, and wherein the function of the computer program application is also for the primary purpose of the wearable device.

9. The method of claim 8, wherein the primary purpose is a physical activity measurement purpose.

10. An apparatus for a wearable device , comprising:
    at least one processor ; and
    at least one memory including a computer program code, wherein the at least one memory and the computer program code are configured, with the at least one processor, to cause the apparatus to perform operations comprising:

associating operation of a button of a user interface of the wearable device with a quick-launch function of a computer program application stored in the at least one memory, wherein operation of the button in a state where the computer program application is not being executed and where an icon identifying and enabling launch of the computer program application is not being displayed causes launch of the computer program application;

detecting, while the computer program application is being executed, operation of the button; and in response to the detection, causing execution of a function of the computer program application, the function comprising:

activating at least one sensor of the wearable device and/or at least one sensor external to the wearable device; and triggering a start of a measurement mode of the wearable device, in which measurement data is received at the at least one processor from the at least one sensor.

11. The apparatus of claim 10, wherein the at least one memory and the computer program code are configured, with the at least one processor, to cause the apparatus to provide, in an operating system executed by the at least one processor, a folder-based menu structure, wherein said icon of the computer program application is comprised inside at least one folder, wherein the quick-launch function enables the launch of the computer program application when contents of the folder are not being displayed.

12. The apparatus of claim 11, wherein the operating system is a mobile operating system configured for wearable devices comprising a user-interface configured for reduced-size displays of wearable devices.

13. The apparatus of claim 10, wherein the at least one memory and the computer program code are configured, with the at least one processor, to cause the apparatus to perform operations comprising:

providing the button with a plurality of context-sensitive functions, each function associated with a different operational context of the wearable device;

determining a context in which the operation of the button has been detected; and, executing, as a response to the operation of the button, a function associated with the determined context.

14. The apparatus of claim 10, wherein the at least one memory and the computer program code are configured, with the at least one processor, to cause the apparatus to perform operations comprising causing, in the function of the computer program application, transmission of a wireless communication signal to a cellular phone communicating with the apparatus, the wireless communication signal comprising a message triggering acceptance of an incoming voice call.

15. The apparatus of claim 10, wherein the at least one memory and the computer program code are configured, with the at least one processor, to cause the apparatus to perform operations while executing the computer program application comprising:

entering a limited operation mode by deactivating at least one layer of an operating system of the wearable device, wherein a limited set of functions are available in the limited operation mode, and wherein the function of the computer application is comprised in the limited set of functions.

16. The apparatus of claim 15, wherein the at least one memory and the computer program code are configured, with the at least one processor, to cause the apparatus to perform operations comprising bypassing, in the function of the computer application, said at least one deactivated layer and controlling directly at least one device driver controlling hardware of the wearable device.

17. The apparatus of claim 10, wherein the computer program application is for a primary purpose of the wearable device, and wherein the function of the computer program application is also for the primary purpose of the wearable device.

18. The apparatus of claim 17, wherein the primary purpose is a physical activity measurement purpose.

19. A computer program product embodied on a non-transitory computer-readable medium and comprising program instructions which, when executed by an apparatus, perform a method comprising:

associating operation of a button of a user interface of a wearable device with a quick-launch function of a computer program application stored in the wearable device, wherein operation of the button in a state where the computer program application is not being executed and where an icon identifying and enabling launch of the computer program application is not being displayed causes launch of the computer program application;

detecting, while the computer program application is being executed, operation of the button; and in response to the detection, causing execution of a function of the computer program application, the function comprising:

activating at least one sensor of the wearable device and/or at least one sensor external to the wearable device; and triggering a start of a measurement mode of the wearable device, in which measurement data is received at the at least one processor from the at least one sensor.

\* \* \* \* \*